Jan. 15, 1924. 1,481,204
B. H. HOWARD ET AL
FEEDER FOR INGOT MOLDS
Filed May 12, 1923 2 Sheets-Sheet 1
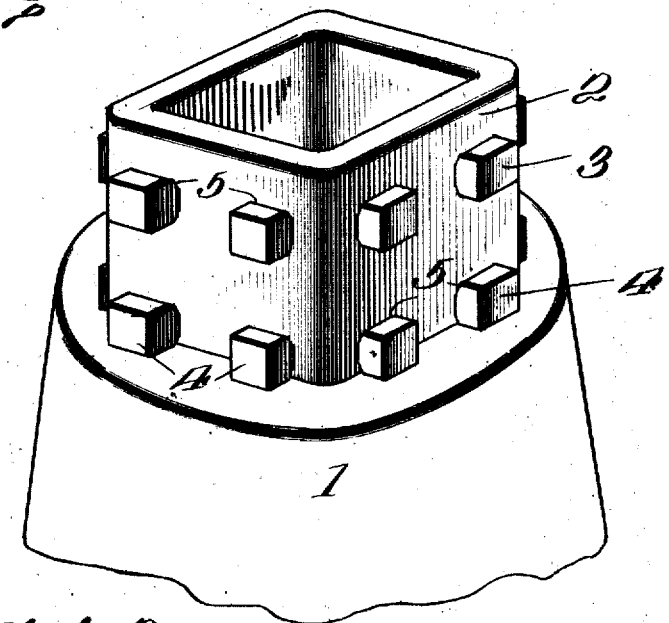
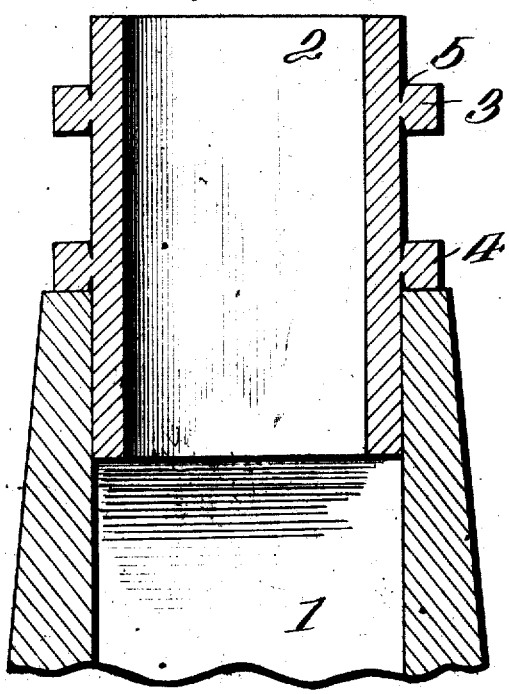
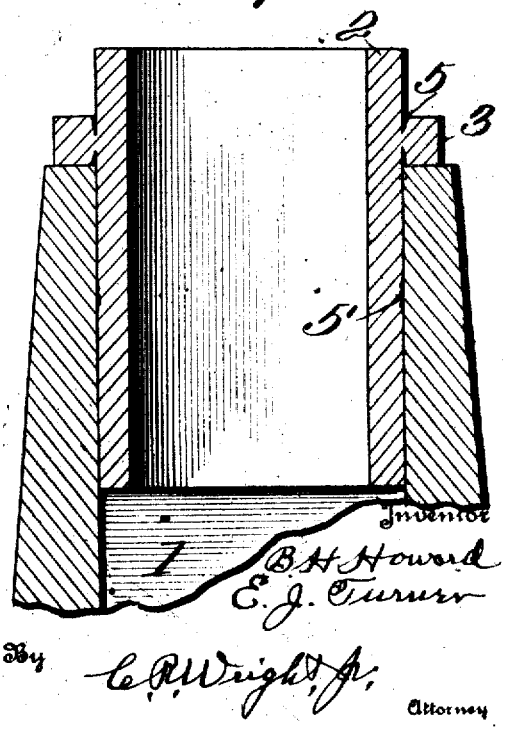
Inventor
B. H. Howard
E. J. Turner
By C. R. Wright, Jr.
Attorney

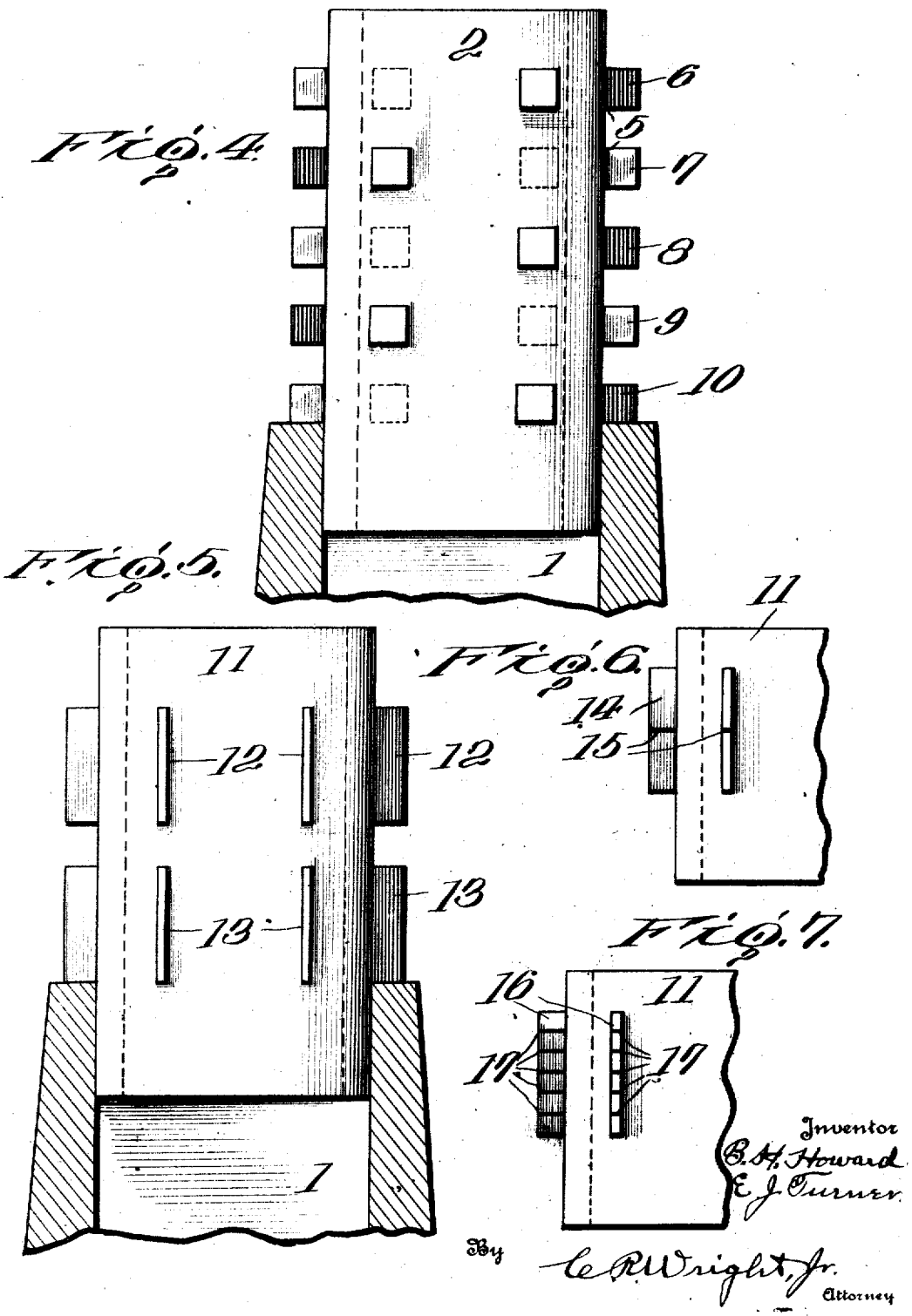

Patented Jan. 15, 1924.

1,481,204

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Original application filed February 12, 1923, Serial No. 618,545. Divided and this application filed May 12, 1923. Serial No. 638,582.

*To all whom it may concern:*

Be it known that BLOOMFIELD H. HOWARD and ERNEST J. TURNER, citizens of the United States, residing, respectively, at the city of Washington, District of Columbia, and Pittsburgh, county of Allegheny, and State of Pennsylvania, have invented certain new and useful Improvements in Feeders for Ingot Molds, of which the following is a specification.

Our invention relates to improvements in feeders for ingot molds and is a division of our application filed February 12, 1923, Serial No. 618,545.

The object of our invention is to provide a feeder for ingot molds whereby the distance the feeder extends into the mold may be readily varied and whereby ingots of a greater or less length may be cast in the same mold and at the same time produce a feeder having all of the advantages of the ordinary feeder to prevent seams and holes known as "piping" and also reduce segregation to a minimum.

Another object of our invention is to provide a feeder of this character which is firmly supported within the upper end of the mold against longitudinal or lateral movement and at the same time provide a simple, cheap and effective feeder having certain details of structure and combination of parts hereinafter more fully described.

In the accompanying drawings:

Figure 1 is a perspective view of an ingot mold showing our improved feeder applied thereto.

Figure 2 is a vertical sectional view of Figure 1.

Figure 3 is a vertical sectional view similar to Figure 2 showing the lower lugs broken off and the feeder extended a greater distance into the mold.

Figure 4 is a sectional view of an ingot mold showing in side elevation a modified form of feeder.

Figure 5 is a sectional view of an ingot mold showing another modified form of feeder.

Figure 6 is a side elevation partly broken away of a feeder showing the same principle employed in Figure 5 except that the ribs are provided with a cross-cut so that a portion can be broken off.

Figure 7 is a view similar to Figure 6 showing the ribs having a series of cross-cuts whereby several adjustments are obtained.

Referring now to the drawings:

1 represents the ordinary ingot mold and 2 our improved feeder. The feeder, as shown, is provided on each side with two series of lugs 3 and 4 which are adapted to engage the upper edge of the mold and support the feeder therein. These lugs, as shown, are arranged in circumferential line and are weakened, close to the feeder, as indicated at 5 so that they may be broken off to allow the feeder to extend further into the mold. As shown in Figure 3, the weakened portion 5 of the lugs allows the same to be broken off flush with the outer periphery of the feeder as indicated at 5 so that the feeder will readily pass into the mold.

In Figure 4 of the drawings, we have shown a feeder provided with five series of lugs 6, 7, 8, 9 and 10, each series having the weakened portions 5 so that they may be broken off and whereby a greater number of adjustments of the feeder in the mold is obtained.

In Figure 5 we have shown the feeder 11 with two series of lugs 12 and 13 made of considerable length and comparatively thin to give the sufficient strength to sustain the weight of the feeder but yet allowing them to be readily broken off so that the feeder can be lowered different distances into the mold.

In Figure 6 we have shown the same principle employed as that shown in Figure 5 except that the ribs 14 are provided with a cross-cut 15 in order that a portion of the rib may be broken off to lower the feeder in the mold.

In Figure 7 we employ the same principle as that shown in Figure 6 except that the ribs 16 are provided with a series of cross-cuts 17 whereby a greater or less portion of the ribs can be broken off to regulate the distance the feeder extends into the mold and to give a greater number of adjustments of the feeder in the mold.

Having thus fully described our invention, what we claim is:

1. A feeder for ingot molds, comprising a body portion and integral narrow ribs vertically disposed and having a cross-cut intermediate the ends whereby a portion of the ribs may be broken off.

2. A feeder for ingot molds, comprising a body portion and integral narrow ribs vertically disposed and having a series of cross-cuts intermediate the ends whereby any portion of the ribs may be broken off.

3. A feeder for ingot molds comprising a body portion and a series of integral narrow ribs vertically disposed and arranged in horizontal rows and having a cross-cut intermediate the ends whereby a portion of the ribs may be broken off.

In testimony whereof we affix our signatures.

BLOOMFIELD H. HOWARD.
ERNEST J. TURNER.